Jan. 13, 1970  G. E. MOORE  3,489,160

EMERGENCY SHUT-OFF VALVE ASSEMBLY

Filed Sept. 12, 1966  2 Sheets-Sheet 1

INVENTOR
GLENN E. MOORE

BY
*Kinney & Schenk.*
ATTORNEYS

Jan. 13, 1970  G. E. MOORE  3,489,160
EMERGENCY SHUT-OFF VALVE ASSEMBLY
Filed Sept. 12, 1966  2 Sheets-Sheet 2

*INVENTOR*
GLENN E. MOORE
BY
*Kinney & Schenk*
ATTORNEYS

United States Patent Office 3,489,160
Patented Jan. 13, 1970

1

3,489,160
EMERGENCY SHUT-OFF VALVE ASSEMBLY
Glenn E. Moore, Fairfield, Ohio, assignor to Dover Corporation, Cincinnati, Ohio, a corporation of Delaware
Filed Sept. 12, 1966, Ser. No. 578,576
Int. Cl. F16k 17/36
U.S. Cl. 137—39                                   3 Claims

ABSTRACT OF THE DISCLOSURE

This invention discloses an emergency shut-off valve for remote pump pedestals having a top shearable section which when sheared off causes closing of the valve and is easily replaceable without disassembly of the entire casing or housing, since only the shearable portion need be replaced.

This invention relates to an emergency shut-off valve assembly and, more particularly, to an emergency shut-off valve assembly for remote pump pedestal units.

In emergency shut-off valve assemblies of the type shown and described in U.S. Patent No. 2,965,116 for use with remote pump pedestal units, the entire valve casing or housing must be replaced if the top shearable section is sheared off to cause closing of the valve, likewise, if the valve seat should be damaged for any reason, it is necessary to replace the valve seat.

The present invention satisfactorily solves these problems by providing a separable shear section, which may be easily replaced, with the valve seat attached thereto. Thus, if the section should be sheared, it is easily replaceable with the present invention without disassembling the entire casing or housing. Likewise, if the valve seat of the present invention should be damaged, it is only necessary to remove the shearable portion, which has the seat thereon, and substitute a new shearable portion in order to replace the seat.

In the emergency shut-off valve assembly of the aforesaid United States patent, the link, which holds the valve in its open position, has a fusible portion. If this portion fuses because of fire, the entire link must be replaced. The present invention eliminates the need for the replacement of the link by using a fusible connection, which is separate from the link. Thus, in the present invention, it is not necessary to replace the link whenever the fusible connection has melted due to a high temperature adjacent the casing or housing. However, the emergency shut-off valve of the present invention still has the capability of the prior United States patent of closing quickly whenever the valve housing or casing is subjected to either an abnormal force or fire.

An object of this invention is to provide an emergency shut-off valve that moves rapidly to its closed position whenever the housing or casing of the valve is subjected to abnormal force or abnormal heat.

Another object of this invention is to provide an emergency shut-off valve assembly having a quickly and easily replacable shearable portion, which is separate from the casing or housing and has a valve seat thereon.

Other objects, uses, and advantages of this invention are apparent upon a reading of this description, which proceeds with reference to the drawings forming part thereof and wherein.

2

Figures 2, 3:
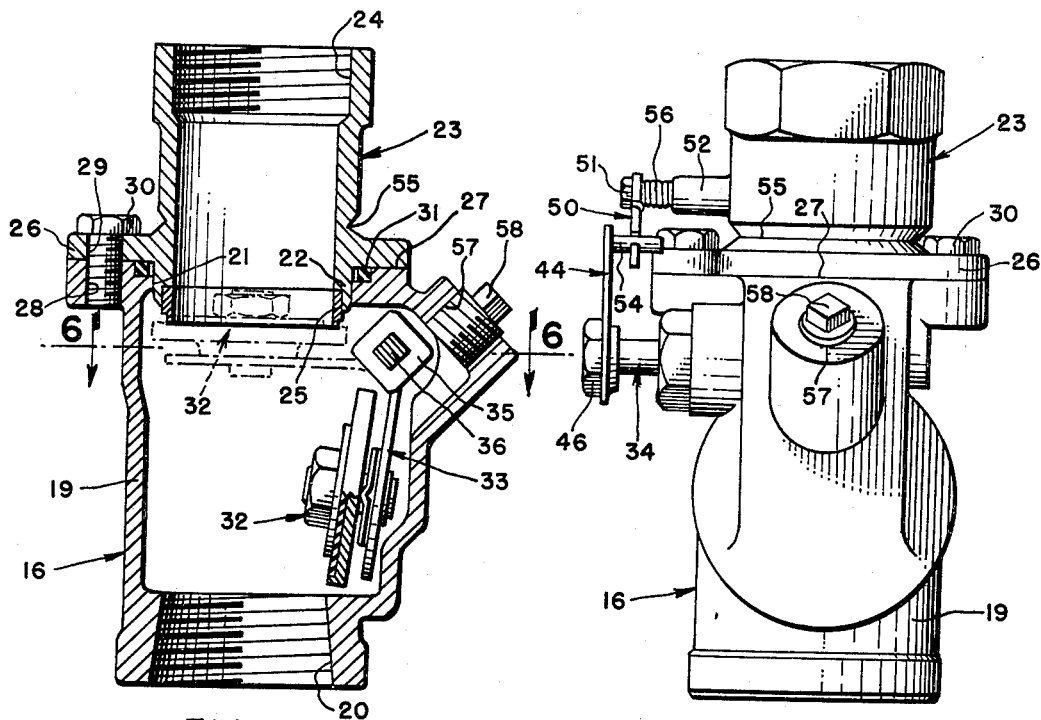
FIGURE 2 is a front elevational view of the valve assembly of the present invention.

FIGURE 3 is a sectional view of the valve assembly of FIGURE 2 with the valve shown in its open position in solid lines and in its closed position in dotted lines.

Figure 4:
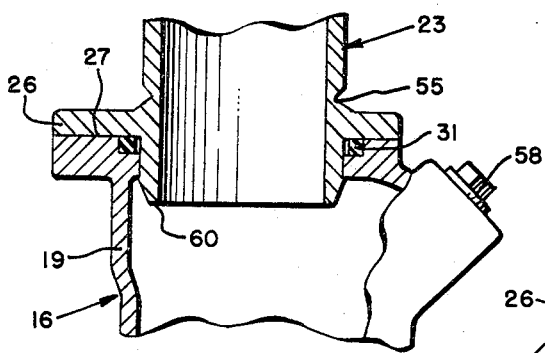

FIGURE 4 is a fragmentary sectional view, similar to a portion of the structure of FIGURE 3, but showing another valve seat construction.

Figure 5:
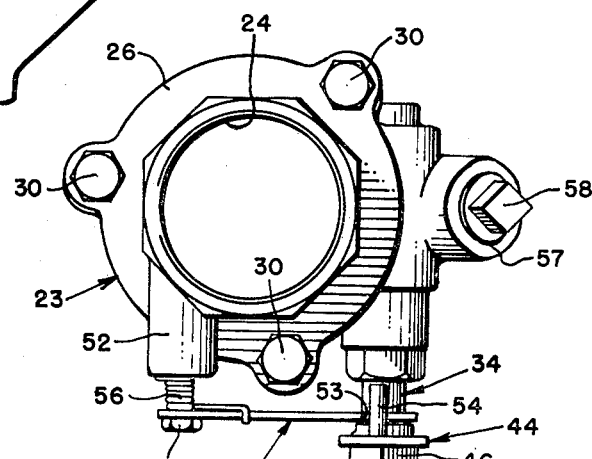

FIGURE 5 is a top plan view of the valve assembly of FIGURE 2.

Figure 6:
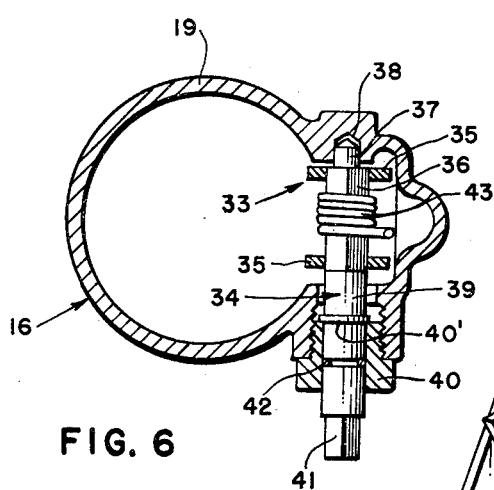

FIGURE 6 is a sectional view of the valve assembly and taken along line 6—6 of FIGURE 3.

Figure 7:
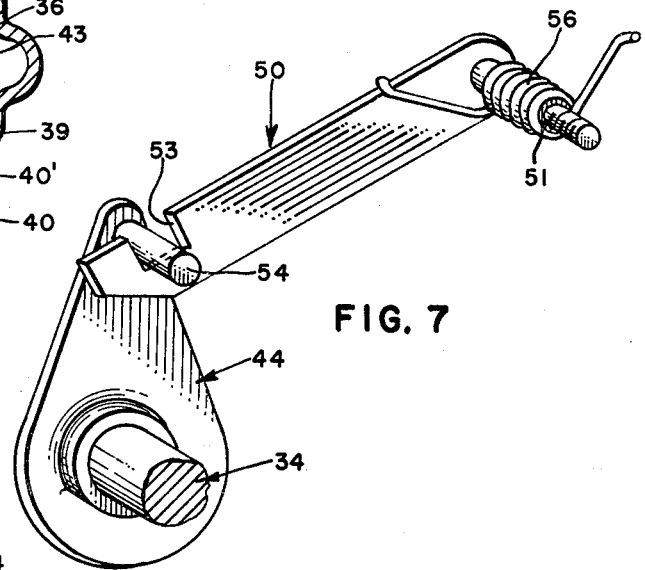

FIGURE 7 is an enlarged perspective view of the latching structure for holding the valve in its open position.

Figure 8:
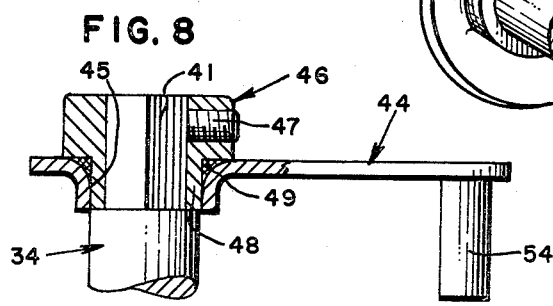

FIGURE 8 is an enlarged sectional view, partly in plan, of the fusible connecting structure for the valve.

Figure 1:
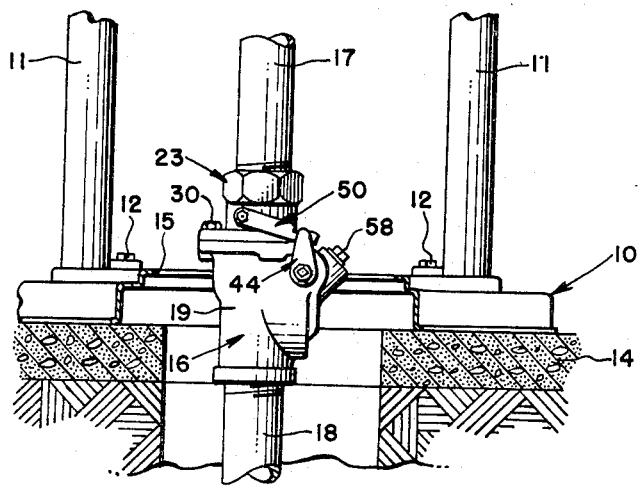
FIGURE 1 is a side elevational view, partly in section, of the bottom end portion of a pedestal including the valve assembly of the present invention for providing a connection from a storage tank to a dispensing system mounted on the pedestal.

Referring to the drawings and particularly FIGURE 1, there is shown a base frame 10 having the bottom ends of posts 11 secured thereto by bolts 12. The base frame 10, which is seated on a foundation 14, has an opening 15 therein. The opening 15 permits the base frame 10 to fit over and surround a shut-off valve assembly 16.

The valve assembly 16 has a conduit 17 connected thereto and extending upwardly therefrom for connection to a dispensing system, which is mounted on the support posts 11. A conduit 18 is connected to the bottom or lower end of the valve assembly 16 and leads therefrom to a storage tank (not shown), which is buried beneath the foundation 14. The base frame 10 and the post unit are known as a pedestal.

As shown in FIGURE 3, the valve assembly 16 includes a hollow casing or housing 19 having an opening 20 in its bottom or lower end. The opening 20 is threaded for connection to exterior threads on the conduit 18 whereby the conduit 18 communicates with the interior of the casing 19.

The casing or housing 19 has an opening 21, which has its axis coaxial with the axis of the opening 20, in its upper end through which an annular portion 22 of a tubular member 23 may be disposed. The upper end 24 of the tubular member 23 is interiorly threaded to receive exterior threads on the conduit 17 for connection thereto. It should be understood that the upper end 24 may be formed with other types of connecting means for cooperation with the conduit 17. Thus, for example, if the conduit 17 were interiorly threaded, the upper end 24 of the tubular member 23 would be exteriorly threaded.

The annular portion 22 of the tubular member 23 has a circular recess formed at its end to receive a ring 25, which is preferably formed of brass. The ring 25 functions as a valve seat and is secured to the tubular member 23 by suitable means such as press fitting, for example.

The tubular member 23 has an integral flange 26, which is adapted to engage upper surface 27 of the casing 19. The upper surface 27 has threaded openings 28 therein with which openings 29 in the flange 26 are aligned to properly position the tubular member 23. Screws 30 are threaded into the aligned openings 28 through openings 29 to attach the tubular member 23 to the casing 19. A seal 31 is compressed between the tubular member 23 and the housing 19 when the tubular member 23 is attached to the casing 19 to prevent fluid leakage therebetween.

Accordingly, the tubular member 23 functions as an extension of the casing or housing 19 and is a part thereof. The passage in the tubular member 23 provides communication from the interior of the casing 19 to the conduit 17.

A valve 32, which preferably has the same structure as the valve shown and described in the aforesaid United States patent, is disposed within the casing or housing 19 for cooperation with the valve seat, which is formed by the ring 25. The valve 32 is mounted on one end of a carrier 33, which is attached by its bifurcated ends 35 to a pivotally mounted shaft or stem 34 for movement therewith. As shown in FIGURE 3, the bifurcated ends 35 have openings therein, which are the same configuration as a non-circular portion 36 of the shaft 34. Thus, the carrier 33 is attached to the shaft 34 for movement therewith so that the valve 32 moves with the shaft 34.

As shown in FIGURE 6, the shaft 34 has a reduced circular end 37, which extends from one side of the non-circular portion 36. The end 37 fits within a socket 38 in one wall of the casing or housing 19.

The shaft 34 has a circular portion 39, which extends from the other side of the non-circular portion 36. The circular portion 39 passes through an opening in a packing nut 40. The nut 40 is threadedly connected to a casing wall, which is opposite the wall of the casing 19 having the socket 38. Thus, the shaft 34 is pivotally mounted in the casing or housing 19. The shaft 34 is retained in place in the casing 19 by a retaining ring 40', which is fitted to the shaft 34 and abuts against the packing nut 40.

The shaft 34 terminates in a non-circular portion 41, which is exterior of the casing or housing 19 and is preferably square shaped. Leakage between the packing nut 40 and the shaft 34 is prevented by a seal 42.

A spring 43 is coiled around the non-circular portion 36 of the shaft 34 between the forked or bifurcated ends 35 of the carrier 33. One end of the spring 43 abuts against a portion of the casing or housing 19 while the other end abuts the carrier 33 on which the valve 32 is mounted.

An arm 44 (see FIGURES 2, 7, and 8) has an opening 45 (see FIGURE 8) adjacent one end thereof. The opening 45 in the arm 44 is larger than the non-circular portion 41 of the shaft 34. This allows the arm 44 to be fitted over the non-circular portion 41 of the shaft 34 and spaced therefrom.

A hub or nut 46 is adapted to fit over the non-circular portion 41 of the shaft 34 (see FIGURE 8) and is secured thereto by a set screw 47. The hub or nut 46 has a reduced portion 48, which is disposed between the non-circular portion 41 of the shaft 34 and the arm 44.

A fusible metal 49 forms a fusible connection between the hub 46 and the arm 44. Since the hub 46 is secured by the set screw 47 to the shaft 34, the arm 44 is fusibly connected to the shaft 34 by the fusible metal 49.

Both the arm 44 and the hub 46 are preferably formed of brass. The fusible metal 49 is formed of an alloy of bismuth, tin, and lead in such proportions as to melt at a predetermined temperature.

Since the arm 44 is fusibly connected to the shaft 34, the valve 32 may be held in its open position (solid lines of FIGURE 3) by retaining the arm 44 against movement. A link 50 (see FIGURES 5 and 7) is employed to cooperate with the arm 44 to hold it in a position wherein the valve 32 is maintained in its open position.

One end of the link 50 is pivotally connected to the tubular member 23 by a screw 51. The screw 51 extends into threaded passage in an integral projecting portion 52 of the tubular member 23. The openings 28 in the casing 19 and the openings 29 in the flange 26 in the tubular member 23 are so positioned that the projecting portion 52 will be properly positioned with respect to the shaft 34 to properly position one end of the link 50 when it is connected to the tubular member 23 by the screw 51. This is accomplished by varying the angular spacing between the openings 28 and providing similar angular spacing between the openings 29. Thus, one end of the link 50 is properly positioned when it is pivotally connected to the tubular member 23 through the screw 51.

The link 50 has a notch 53 formed therein adjacent its other end to receive a pin or stud 54, which extends from one end of the arm 44. The pin 54 is disposed at the opposite end of the arm 44 to its fusible connection with the shaft 34 as clearly shown in FIGURES 7 and 8.

When the link 50 is pivotally connected to the tubular member 23 and the pin 54 is disposed within the notch 53 of the link 50, the link 50 holds or maintains the arm 44 in a position whereby the valve 32 is held in its open position against the force of the spring 43. This is due to the friction between the pin 54 and the surfaces of the notch 53 in the link 50.

The exterior surface of the tubular member 23 has an annular groove 55 (see FIGURES 2 and 3), which is formed above the flange 26 and beneath the projecting portion 52, to provide a weakened portion or area in the member 23. If sufficient force is exerted on the tubular member 23, the valve casing 19, the conduit 17, or the conduit 18, the tubular member 23 will be sheared at the annular groove 55.

Since the link 50 is pivotally connected to the tubular member 23 by the screw 51, movement of the portion of the tubular member 23 above the annular groove 55 with respect to the portion below the annular groove 55 and the connected casing or housing 19 due to shearing results in movement of the link 50. As a result, the friction between the pin 54 and the surfaces of the notch 53 is not sufficient to hold the pin 54 within the notch 53 whereby the valve 32 is moved to its closed position by the spring 43.

However, it is not necessary for the tubular member 23 to be sheared at the annular groove 55 for the arm 44 to be released from its connection with the link 50. Any abnormal shock or force, which is not sufficient to cause shearing, to the tubular member 23, the valve casing 19, the conduit 17, or the conduit 18 may result in release of the arm 44 from the link 50.

If the abnormal force and the force of a spring 56, which is wound around the screw 51 between a surface of the link 50 and the projecting portion 52 of the tubular member 23 and urges the link 50 downwardly, are sufficient to overcome the friction between the pin 54 and the surfaces of the notch 53, the arm 44 will be released. Since the force of the spring 56, which has one end acting on the link 50 while its other end acts against the tubular member 23, is constant, release of the arm 44 occurs when the abnormal force exceeds a predetermined value. Thus, certain types of vibrations will cause release of the arm 44 whereby the valve 32 moves to its closed position. It should be understood that the spring 56 also aids in disconnecting the pin 54 from the notch 53 when shearing occurs.

It should be understood that shearing of the tubular member 23 at the annular groove 55 may occur from frost heave or impact against the posts 11 or the supported dispensing system by an automobile, for example. If the impact force did not cause shearing, it still could create a sufficient vibrating force to close the valve 32.

Because of the fusible connection between the arm 44 and the shaft 34, fire or other source of heat beyond a predetermined temperature will cause melting of the fusible metal 49. When this occurs, the shaft 34 is movable with respect to the arm 44 so that the valve 32 is moved to its closed position by the spring 43. No movement between the link 50 and the arm 44 is required since all of the necessary movement occurs between the shaft 34 and the arm 44. Thus, in event of a fire or abnormal heat, it is not necessary to replace the link 50 but only to fusibly connect the arm 44 again to the shaft 34.

In assembling the valve structure of the present invention, the valve 32 and the carrier 33 may both be inserted into the valve casing or housing 19 through the opening 21 in the top of the casing 19. The shaft 34 is then passed through the threaded opening, which threadedly receives the packing nut 40, and through the carrier's bifurcated end 35, which is closest to the threaded opening.

The spring 43 is then positioned in the casing 19 for receipt of the shaft 34. The shaft 34 is then progressed through the spring 43 and the other of the carrier's bifurcated ends 35 until the reduced end 37 of the shaft 34 rests in the socket 38. The packing nut 40 is then secured to the threaded opening in the casing 19 and bears against the retaining ring 40′ positioned on shaft 34 whereby the valve 32 is disposed within the casing 19 to complete the pre-assembly of the lower portion of the valve assembly 16.

The tubular member 23 is then attached to the casing 19 by the screws 30.

The threaded opening 57 is closed by a threaded plug 58.

After attachment of the tubular member 23 to the casing 19, the latching mechanism is installed. That is, the arm 44 which may be preassembled to hub 46 with fusible metal 49 is fitted over the non-circular portion 41 of the shaft 34.

Of course, the link 50 must be pivotally connected to the tubular member 23 by the screw 51. The spring 56 is coiled around the screw 51 before the screw 51 is attached to the tubular member 23.

The valve structure is now ready for installation. It should be observed that no connection is necessary at this time between the arm 44 and the link 50 so that the valve 32 may remain in a closed position if desired. After the valve assembly 16 is connected to the conduits 17 and 18, then the pin 54 on the arm 44 may be disposed within the notch 53 of the link 50 to hold the valve 32 in its open position.

In operation, the valve assembly 16 connects the conduits 17 and 18 to each other. Thus, the gasoline or other fluid flows from the conduit 18 into the interior of the casing 19 through the bottom opening 20. The gasoline exits from the casing 19 into the passage in the tubular member 23 from which it flows into the conduit 17. This direction of fluid flow also aids the spring 43 in holding the valve 32 closed in the event of valve has closed as the result of an emergency.

With the valve assembly 16 connected to the conduits 17 and 18, any abnormal shock or force against the conduit 17 or any of the structures connected thereto such as by vehicle impact, for example, may result in shearing of the tubular member 23 at the annular groove 55. If this occurs, the valve 32 is quickly moved to its closed position since the pivotal connection of the link 50 is changed.

Even if this force is not sufficient to shear the tubular member 23 at the annular groove 55, it may be sufficient with the force of the spring 56 to overcome the friction between the pin 54 and the surfaces of the notch 53. When this occurs, the pin 54 is disconnected from the link 50 whereby the spring 43 quickly moves the valve 32 to its closed position (dotted lines of FIGURE 3).

If there should be frost heave, this may produce a sufficient abnormal force to again cause shearing of the tubular member 23 at the annular groove 55. Again, the spring 43 is able to move the valve 32 to its closed position because the pivotal connection of the link 50 is again changed.

Whenever there is shearing of the tubular member 23 at the annular groove 55, the tubular member 23 may be quickly replaced. It is only necessary to remove the screws 30 and disconnect the conduit 17 from the tubular member 23. A new tubular member 23 may then be connected to the conduit 17 and attached to the casing 19 by the screws 30. Thus, the shutdown time of the dispensing system, which is connected to the posts 11, is substantially reduced.

If an abnormal force should cause closing of the valve 32 without shearing of the tubular member 23 at the annular groove 55, an inspection will indicate whether the tubular member 23 needs to be replaced or some other element of the structure needs replacing. Again, the shutdown time is reduced. Furthermore, closing of the valve 32 by an abnormal force should result in a careful inspection of the structure. This prevents utilization of the dispensing system until the valve is reopened following the inspection.

If fire or other source of abnormal heat should occur about the valve assembly 16, the fusible metal 49 fuses whereby the connection between the arm 44 and the shaft 34 will be broken. As a result, the shaft 34 is free to be rotated by the force of the spring 43 to move the valve 32 to its closed position.

When this occurs, it is only necessary to again apply fusible metal 49 between the hub 46 and the arm 44 to connect the arm 44 to the shaft 34.

Accordingly, it is not necessary to replace the link 50 when the fusible metal 49 is fused. Thus, a cost reduction is accomplished by this feature as well as by replacing only the tubular member 23 rather than the entire casing 19 when the valve assembly 16 is subjected to an abnormal shock or force.

If the valve seat should fail for some reason, it may be readily replaced by merely replacing the tubular member 23.

Another form of the valve seat is shown in FIGURE 4 wherein lower end 60 of the tubular member 23 is formed to function as a valve seat so that the valve seat is integral with the member 23. In this arrangement, the necessity for attaching the valve seat to the tubular member 23 is eliminated. However, if the valve seat should fail without shearing of the tubular member 23, it is observed that the tubular member 23 not only must be replaced but it is not salvageable. Thus, while the integral valve seat has the advantage of being less expensive to manufacture, it does not have salvage value in the same manner as the removable valve seat, which is formed by the ring 25, since the ring 25 may be removed from the tubular member 23 and another of the rings 25 attached thereto.

While the tubular member 23 has been described in conjunction with the link 50, the arm 44, and the fusible connection between the arm 44 and the shaft 34, it should be understood that the removable tubular member 23 may be utilized in a shut-off valve assembly using the fusible link construction of the aforesaid United States patent or any other type of latching structure for holding the valve 32 in its open position until either there is an abnormal force or there is fire or other source of abnormal heat around the valve assembly 16. Likewise, it should be understood that the link 50, the arm 44, and its fusible connection with the shaft 34 could be employed with other emergency shut-off valves.

While the tubular member 23 has been described as being attached to the casing 19 by the screws 30, it should be understood that other types of securing means could be employed between the tubular member 23 and the casing 19. For example, the opening 21 could be threaded and the outer surface of the tubular member 23 threaded at the reduced portion 22 to connect the tubular member 23 to the casing 19. In this arrangement, the tubular member 23 and the casing 19 would require aligning means to insure the proper positioning of the projecting portion 52 with respect to the shaft 34.

An advantage of this invention is that the valve structure may be easily assembled. Another advantage of this invention is that the damaged art may easily be replaced without replacing the entire valve structure. A further advantage of this invention is that the damaged valve seat may be easily replaced. Still another advantage of this invention is that the valve may be moved to its closed position due to an abnormal force, which could cause leakage in the system without shearing the tubular member.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

What is claimed is:

1. A shut-off valve assembly comprising a casing, a tubular member detachably connected to the upper end of said casing, and having a weakened portion formed therein closely adjacent the lower end thereof, said tubular member having its lower end terminating in a valve seat and having a peripheral flange in spaced relation to said seat and providing a downwardly projecting portion, which has a cylindrical outer surface, the upper end of said valve casing having an opening defined by a cylindrical surface receiving said projecting portion in telescopic relation and having a flange in abutting relation to the flange of said tubular member and forming a joint therebetween, sealing means between said flanges and removable means cooperating with said flanges to clamp them together and removably secure said tubular member to said valve casing in sealed relation, said casing having a valve pivotally mounted therein for engaging said valve seat in its closed position, linking means exterior of said casing connected to said valve and holding it in open position, mounting means for said linkage, said mounting means including spaced connecting points above and below said weakened portion and said joint, said linkage including a fusible means in said linkage means rendering said linkage means ineffective upon fusing and permitting said valve to close.

2. A shut-off assembly comprising a casing, a tubular member detachably connected to the upper end of said casing, and having a weakened portion formed therein closely adjacent the lower end thereof, said tubular member having its lower end terminating in a valve seat and having a peripheral flange in spaced relation to said seat and providing a downwardly projecting portion, the upper end of said valve casing having an opening receiving said projecting portion in telescopic relation and having a flange in abutting relation to the flange of said tubular member and forming a joint therebetween, sealing means between said flanges and removable means cooperating with said flanges to clamp them together and removably secure said tubular member to said valve casing in sealed relation, said casing having a valve pivotally mounted therein for engaging said valve seat in its closed position, linking means exterior of said casing connected to said valve and holding it in open position, mounting means for said linkage, said mounting means including spaced connecting points above and below said weakened portion and said joint, said linkage including a fusible means in said linkage means rendering said linkage means ineffective upon fusing and permitting said valve to close.

3. A shut-off valve assembly comprising a casing, a tubular member detachably connected to the upper end of said casing, and having a weakened portion formed therein closely adjacent the lower end thereof, said tubular member having its lower end terminating in a valve seat and having a peripheral flange in spaced relation to said seat and providing a downwardly projecting portion, the upper end of said valve casing having an opening receiving said projecting portion in telescopic relation and having a flange in abutting relation to the flange of said tubular member and forming a joint therebetween, sealing means between said flanges and removable means cooperating with said flanges to clamp them together and removably secure said tubular member to said valve casing in sealed relation, said casing having a valve pivotally mounted therein for engaging said valve seat in its closed position, linking means exterior of said casing connected to said valve and holding it in open position, mounting means for said linkage, said mounting means including spaced connecting points above and below said weakened portion and said joint, said linkage including a fusible means in said linkage means rendering said linkage means ineffective upon fusing and permitting said valve to close, said valve pivotal mounting means including a shaft rotatably mounted in the walls of said casing and traversing the same, an access opening in the side of said casing and a closure for said opening.

References Cited

UNITED STATES PATENTS

| | | | |
|---|---|---|---|
| 1,028,682 | 6/1912 | Creighton et al. | 137—77 |
| 2,640,491 | 6/1953 | Mac Bain | 137—75 |
| 2,898,926 | 8/1959 | Tsiguloff | 137—78 |
| 2,965,116 | 12/1960 | Boone et al. | 137—68 XR |
| 3,378,021 | 4/1968 | Milo | 137—75 X |

WILLIAM F. O'DEA, Primary Examiner

R. GERARD, Assistant Examiner

U.S. Cl. X.R.

137—68, 75